(12) United States Patent
Kita

(10) Patent No.: US 8,072,571 B2
(45) Date of Patent: Dec. 6, 2011

(54) DISPLAY DEVICE

(75) Inventor: Makoto Kita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 190 days.

(21) Appl. No.: 12/668,941

(22) PCT Filed: Aug. 7, 2008

(86) PCT No.: PCT/JP2008/002159
§ 371 (c)(1),
(2), (4) Date: Jan. 13, 2010

(87) PCT Pub. No.: WO2009/072225
PCT Pub. Date: Jun. 11, 2009

(65) Prior Publication Data
US 2010/0181902 A1    Jul. 22, 2010

(30) Foreign Application Priority Data
Dec. 6, 2007  (JP) ................................. 2007-315518

(51) Int. Cl.
*G02F 1/1339* (2006.01)
(52) U.S. Cl. ............ 349/153; 349/56; 349/84; 349/155; 349/156; 349/158
(58) Field of Classification Search ............ 349/56, 349/84, 153, 155, 156, 158
See application file for complete search history.

(56) References Cited

U.S. PATENT DOCUMENTS

| | | | |
|---|---|---|---|
| 6,593,992 B1* | 7/2003 | Chin et al. | 349/153 |
| 2011/0013125 A1* | 1/2011 | Lee et al. | 349/106 |

FOREIGN PATENT DOCUMENTS

| | | |
|---|---|---|
| GB | 2 350 204 | 11/2000 |
| JP | 3-24634 | 3/1991 |
| JP | 7-199209 | 8/1995 |
| JP | 9-33933 | 2/1997 |
| JP | 9-244055 | 9/1997 |
| JP | 2002-365653 | 12/2002 |
| JP | 2006-91434 | 4/2006 |
| JP | 2006-119667 | 5/2006 |

OTHER PUBLICATIONS

International Search Report for PCT/JP2008/002159, mailed Oct. 7, 2008.

* cited by examiner

*Primary Examiner* — Jennifer Doan
(74) *Attorney, Agent, or Firm* — Nixon & Vanderhye, P.C.

(57) ABSTRACT

A display device includes a first substrate and a second substrate opposed to each other and a rectangular frame-shaped sealing material configured to bond the first and second substrates together. The first substrate has an interconnect layer overlapping a corner of the sealing material, a layered insulating film including an inorganic insulating film and an organic insulating film placed one upon the other on the interconnect layer, and a transparent conductive layer formed on the layered insulating film to be connected to the interconnect layer via a contact hole formed through the layered insulating film. The second substrate has an electrode layer electrically connected to the transparent conductive layer. The inorganic insulating film has an exposed portion exposed from the organic insulating film in the corner of the sealing material. The exposed portion is entirely exposed from the transparent conductive layer. In the exposed portion, a through hole is formed through the interconnect layer, and the inorganic insulating film covers the through hole.

3 Claims, 12 Drawing Sheets

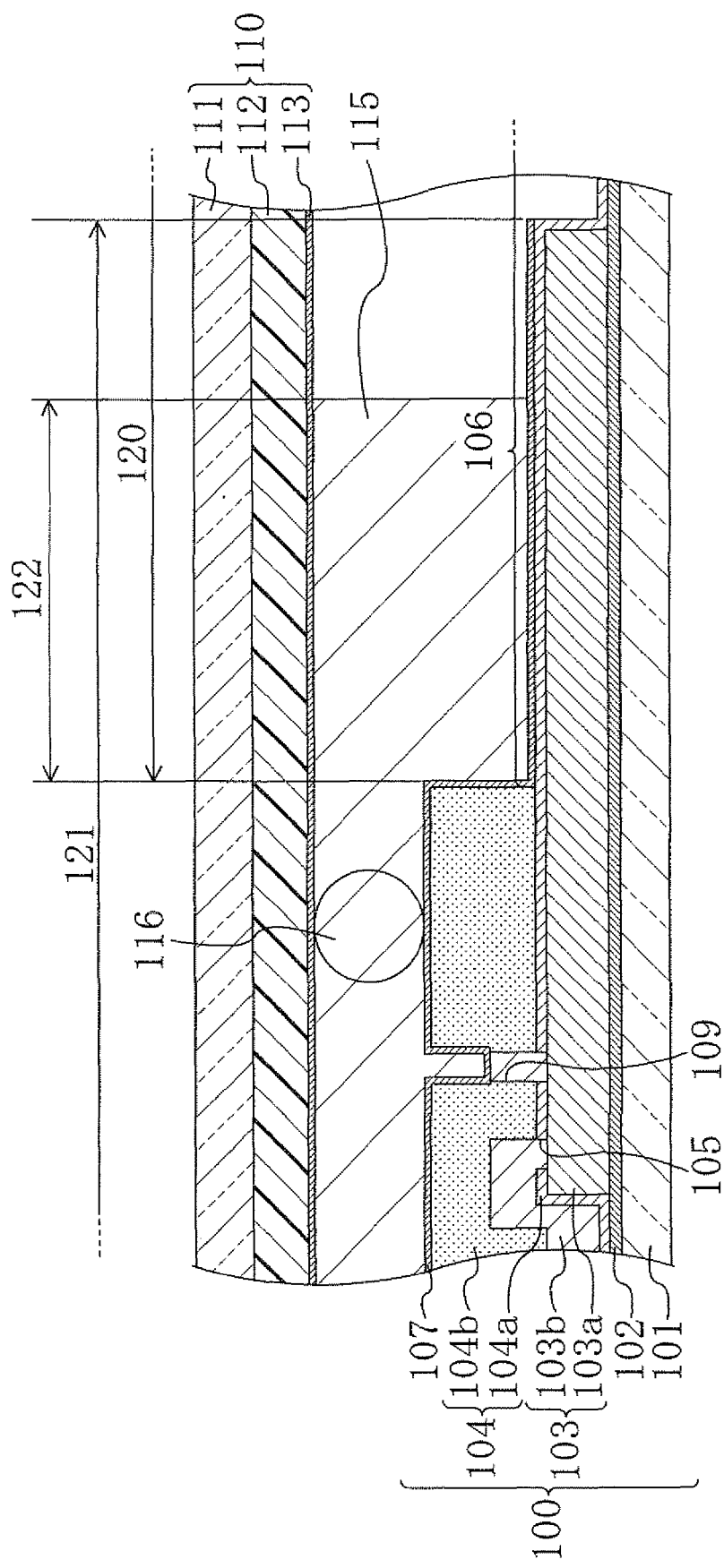

DISPLAY DEVICE

This application is the U.S. national phase of International Application No. PCT/JP2008/002159 filed 7 Aug. 2008, which designated the U.S. and claims priority to Japan Application No. 2007-315518 filed 6 Dec. 2007, the entire contents of each of which are hereby incorporated by reference.

TECHNICAL FIELD

The present disclosure relates to a display device such as a liquid crystal display device.

BACKGROUND ART

Conventionally, taking advantage of their features of being thin and consuming low power, liquid crystal display devices have been widely used as displays for office automation (OA) equipment such as personal computers and portable information equipment such as cellular phones and personal digital assistants (PDAs).

A liquid crystal display device includes a thin film transistor (TFT) substrate, a counter substrate opposed to the TFT substrate, and a liquid crystal layer sealed with a rectangular frame-shaped sealing material between the TFT substrate and the counter substrate.

In the counter substrate, a common electrode layer and the like are formed on the side thereof facing the TFT substrate. In the TFT substrate, a plurality of interconnects including a plurality of source lines, a plurality of gate lines, a common interconnect for supplying a signal to the common electrode layer, and the like are formed. The TFT substrate often has a layered insulating film including an inorganic insulating film and an organic insulating film stacked one upon the other to cover the plurality of interconnects described above.

Since the TFT substrate and the counter substrate are fixed to each other with a sealing material, it is desirable to provide high adherence of the sealing material to the TFT substrate and the counter substrate.

For example, for enhancing the adherence of the sealing material to the TFT substrate, Patent Document 1 discloses a method in which an organic insulating film is partly removed to allow a sealing material to adhere directly to an inorganic insulating film that is comparatively high in adherence to the sealing material.

CITATION LIST

PATENT DOCUMENT

PATENT DOCUMENT 1: Japanese Patent Publication No. P2006-91434

SUMMARY OF THE INVENTION

Technical Problem

FIG. 13 is a schematic enlarged plan view of a corner of a sealing material 115 in a conventional liquid crystal display device. FIG. 14 is a cross-sectional view of the corner of the sealing material 115 taken along line XIV-XIV in FIG. 13.

As shown in FIG. 14, the liquid crystal display device is formed by bonding a TFT substrate 100 and a counter substrate 110 together with the rectangular frame-shaped sealing material 115.

In the counter substrate 110, a plurality of color filters (not shown) and a black matrix 112 defining the color filters are formed on a glass substrate 111, and a common electrode layer 113 is formed to cover the color filters and the black matrix 112.

In the TFT substrate 100, an insulating film 102 is formed on the surface of a glass substrate 101, and a common interconnect 103 for supplying a signal to the common electrode layer 113 is formed on the insulating film 102. The common interconnect 103 includes a first common interconnect 103a and a second common interconnect 103b.

The first common interconnect 103a is formed on the insulating film 102 so as to overlap a corner of the sealing material 115 as shown in FIG. 13, and is covered with an inorganic insulating film 104a having a contact hole 105 as shown in FIG. 14. The second common interconnect 103b, which is connected to the first common interconnect 103a via the contact hole 105, extends along the sealing material 115 as shown in FIG. 13.

An organic insulating film 104b is formed on a portion of the inorganic insulating film 104a as shown in FIG. 14. The organic insulating film 104b is partly removed in a region in which the sealing material 115 is placed to prevent the sealing material 115 from spreading outward by being pressed when the TFT substrate 100 and the counter substrate 110 are bonded together. Hence, the inorganic insulating film 104a has an exposed portion 106 exposed from the organic insulating film 104b.

On the layered insulating film 104, a common electrode terminal 107 for electrically connecting the common interconnect 103 to the common electrode layer 113 is formed at a position overlapping the sealing material 115. The common electrode terminal 107 is connected to the common interconnect 103 via a contact hole 109 formed through the layered insulating film 104, and is connected to the common electrode layer 113 via a conductive particle 116 contained in the sealing material 115.

As described above, the exposed portion 106 and the common electrode terminal 107 are preferably provided at a corner of the sealing material 115 from the standpoint that a region for placing a driver circuit should be secured on the TFT substrate 100.

However, as shown in FIGS. 13 and 14, when there is a region 122 (hatched region in FIG. 13) in which the region where the sealing material 115 is foamed overlaps both a region 120 where the exposed portion 106 is formed and a region 121 where the common electrode terminal 107 is formed, the inorganic insulating film 104a exposed from the organic insulating film 104b is covered with the common electrode terminal 107 in the region 122. Hence, the sealing material 115 is bonded to the common electrode terminal 107. The common electrode terminal 107, which is a transparent conductive layer made of indium tin oxide (ITO) and the like, is comparatively low in adherence to the sealing material 115. Therefore, the adherence between the TFT substrate 100 and the sealing material 115 is low.

In the method disclosed in Patent Document 1, in which the organic insulating film is removed, also, when there is a region in which the region where the sealing material is formed overlaps both a region where the organic insulating film has been removed and a region where a common electrode terminal is formed, the sealing material will be bonded to the common electrode terminal in a portion of the region where the organic insulating film has been removed. Therefore, the adherence between the TFT substrate and the sealing material will be low.

In view of the problem described above, an object of the present invention is enhancing the adherence between a sealing material and a substrate having a transparent conductive layer for supplying a signal to an electrode layer of a counter substrate.

Solution to the Problem

To attain the above object, according to the present invention, the entire exposed portion of an inorganic insulating film exposed from an organic insulating film is exposed from a transparent conductive layer. In the exposed portion, a through hole is formed through an interconnect layer connected to the transparent conductive layer, and the inorganic insulating film is placed to cover the through hole.

Specifically, the display device of the present invention includes: a first substrate and a second substrate opposed to each other; and a rectangular frame-shaped sealing material configured to bond the first substrate and the second substrate together, wherein the first substrate has an interconnect layer formed to overlap a corner of the sealing material, a layered insulating film including an inorganic insulating film and an organic insulating film stacked one upon the other to overlap the interconnect layer, and a transparent conductive layer formed on the layered insulating film to be connected to the interconnect layer via a contact hole formed through the layered insulating film, the second substrate has an electrode layer connected to the transparent conductive layer via a conductive particle contained in the sealing material, the inorganic insulating film has an exposed portion exposed from the organic insulating film at the corner of the sealing material, the exposed portion is entirely exposed from the transparent conductive layer, and in the exposed portion, a through hole is fanned through the interconnect layer, and the inorganic insulating film is formed to cover the through hole.

The exposed portion is preferably provided in each of the four corners of the sealing material.

The display device may further include a liquid crystal layer sealed inside the frame-shaped sealing material between the first substrate and the second substrate.

Function

Next, the function of the present invention will be described.

First, a cross peel strength test performed to measure the adherence of a sealing material to an alignment film, a transparent conductive layer, an organic insulating film, an inorganic insulating film, and a glass substrate will be described with reference to FIGS. 9 and 10. FIGS. 9 and 10 are perspective views schematically showing a test apparatus used for the cross peel strength test and the operation thereof.

In the cross peel strength test, the peel strength of a sealing material (epoxy resin) was measured against a polyimide (PT) film, an ITO film, an acrylic resin film, and a SiN film that respectively correspond to the alignment film, the transparent conductive layer, the organic insulating film, and the inorganic insulating film, and against a glass substrate (SiO). The peel strength as used herein refers to the degree of force required to peel off the sealing material from the above films and the glass substrate to which the sealing material has been bonded.

As shown in FIG. 9, the test was performed using a cross peel strength test apparatus having a stationary stage 40 and a rotational press jig 41 positioned above the stage 40. A test specimen 43 is placed on the stage 40. As shown in FIG. 10, the jig 41 is configured to be rotatable around a rotational axis 41a normal to the surface of the stage 40 to apply a rotational force to the test specimen 43 placed on the stage 40 while applying a weight to the test specimen 43 in the direction toward the stage 40. In FIG. 10, arrow 47 indicates the direction in which the jig 41 applies a weight to the test specimen 43, and arrow 48 indicates the direction in which the jig 41 rotates.

The test specimen 43 includes a pair of substrates 45 and 46 placed one upon the other to cross each other at right angles via one point sealing material 44. In measuring the peel strength of the sealing material 44 against the PI film, the ITO film, the acrylic resin film, and the SiN film, films of each type (the PI film, the ITO film, the acrylic resin film, and the SiN film) were formed on the surfaces of the two substrates 45 and 46 so as to sandwich the sealing material 44 between the films, to prepare the test specimen 43, and the test was performed for the test specimen 43. In measuring the peel strength of the sealing material against the glass substrate, glass substrates as the substrates 45 and 46 were placed to sandwich the sealing material 44 therebetween, to prepare the test specimen 43, and the test was performed for the test specimen 43.

By the above test, the peel strength of the sealing material 44 against the films and the glass substrate was measured based on the weight and the rotational force applied to the test specimen 43 by the jig 41, the diameter of the sealing material 44, and the displacement of the substrates 45 and 46 with respect to the sealing material 44, and the resultant peel strength was determined as the adherence of the sealing material 44 to the films and the glass substrate.

FIG. 11 shows the peel strength (adherence) of the sealing material (epoxy resin) against the PI film, the ITO film, the acrylic resin film, the SiN film, and the glass substrate obtained in the manner described above.

As shown in FIG. 11, the measured values of the peel strength of the sealing material against the SiN film and the glass substrate (SiO) were four time or more as large as that against any of the other films (the PI film, the ITO film, and the acrylic resin film). In particular, the measured value of the peel strength of the sealing material against the SiN film was ten times or more as large as that against any of the ITO film and the acrylic resin film.

As described above, by the cross peel strength test, the peel strength of the sealing material against the alignment film, the transparent conductive layer, the organic insulating film, the inorganic insulating film, and the glass substrate constituting the display device was measured a plurality of times. From this measurement, the results shown in FIG. 12 were obtained. FIG. 12 is a view showing the relationship among the degrees of adherence of the sealing material to the alignment film, the transparent conductive layer, the organic insulating film, the inorganic insulating film, and the glass substrate constituting the display device. As shown in FIG. 12, the adherence of the sealing material to the inorganic insulating film is markedly higher than that to any of the organic insulating film and the transparent conductive film.

In consideration of the above, according to the present invention, the entire exposed portion of the inorganic insulating film exposed from the organic insulating film is exposed from the transparent conductive layer. Hence, in the entire region of the exposed portion overlapping the sealing material, the sealing material is directly bonded to the inorganic insulating film.

In addition, in the exposed portion, a through hole is formed through the interconnect layer, and the inorganic insulating film is formed to cover the through hole. Since the inorganic insulating film has a depression at the portion covering the through hole, the surface area of the inorganic insulating film to be bonded to the sealing material increases.

Also, when the sealing material is exposed to light from the first substrate side, light is less blocked by the interconnect layer. This enhances the light transmittance to the sealing material under the light exposure, permitting the sealing material to be set more reliably. Hence, the adherence between the sealing material and the first substrate enhances.

In particular, when the exposed portion is provided at each of the four corners of the sealing material, the surface area of the portions of the inorganic insulating film to which the sealing material is bonded increases, and also the light transmittance to the sealing material under the light exposure from the first substrate side enhances, compared with when the exposed portion is not provided at all the four corners of the sealing material. Hence, the adherence between the sealing material and the first substrate further enhances.

When a liquid crystal layer is sealed inside the frame-shaped sealing material between the first substrate and the second substrate, also, advantages of the function of the present invention can be practically obtained.

ADVANTAGES OF THE INVENTION

According to the present invention, the sealing material can be directly bonded to the inorganic insulating film in the entire overlap region of the exposed portion of the inorganic insulating film exposed from the organic insulating that overlaps the sealing material. In addition, the surface area of the inorganic insulating film bonded to the sealing material can be increased, and the light transmittance to the sealing material under light exposure from the first substrate side enhances, permitting the sealing material to be set more reliably. As a result, the adherence between the sealing material and the first substrate can be enhanced.

BRIEF DESCRIPTION OF THE DRAWINGS

FIG. 14 is a view schematically showing the section taken along line XIV-XIV in FIG. 13.

Figure 1:
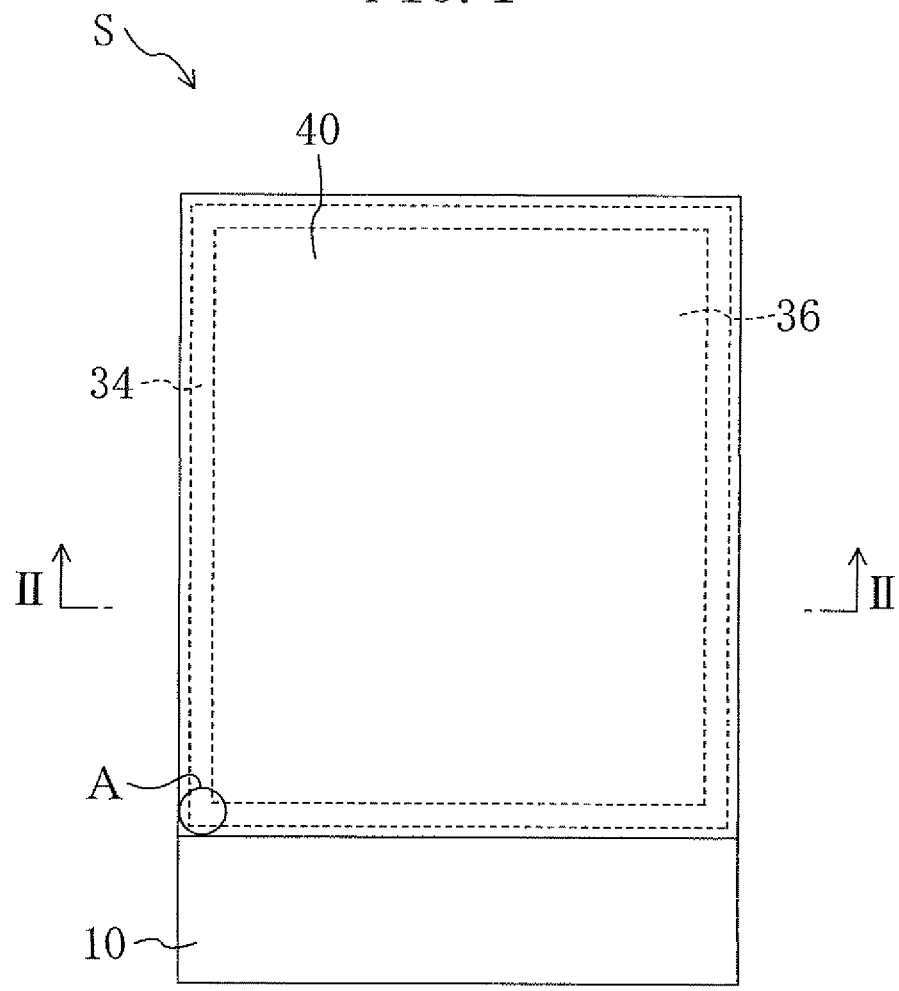
FIG. 1 is a plan view schematically showing a liquid crystal display device of Embodiment 1.

DESCRIPTION OF REFERENCE CHARACTERS (S) Liquid crystal display device (display device)
(A) Corner of sealing material
(10) TFT substrate (first substrate)
(13) Common interconnect (interconnect layer)
(13a) First common interconnect (interconnect layer)
(13b) Second common interconnect (interconnect layer)
(14) Layered insulating film
(14a) Inorganic insulating film
(14b) Organic insulating film
(16) Exposed portion
(17) Through hole
(18) Contact hole
(19) Common electrode terminal (transparent conductive layer)
(30) Counter substrate (second substrate)
(33) Common electrode layer (electrode layer)
(34) Sealing material
(35) Conductive particle

DESCRIPTION OF EMBODIMENTS

An embodiment of the present invention will be described in detail with reference to the drawings. Note that the present invention is not limited to the embodiments described below.

Embodiment 1

Figure 2:
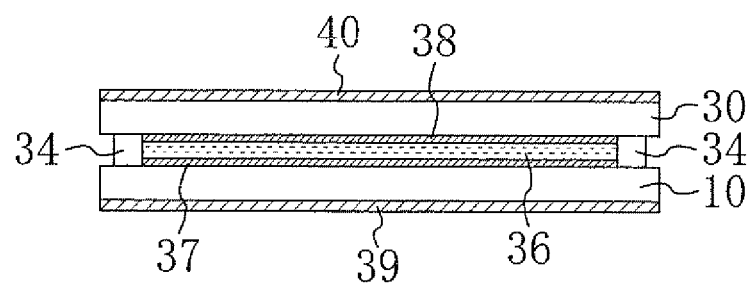
FIG. 2 is a view schematically showing the section taken along line II-II in FIG. 1.
Figure 3:
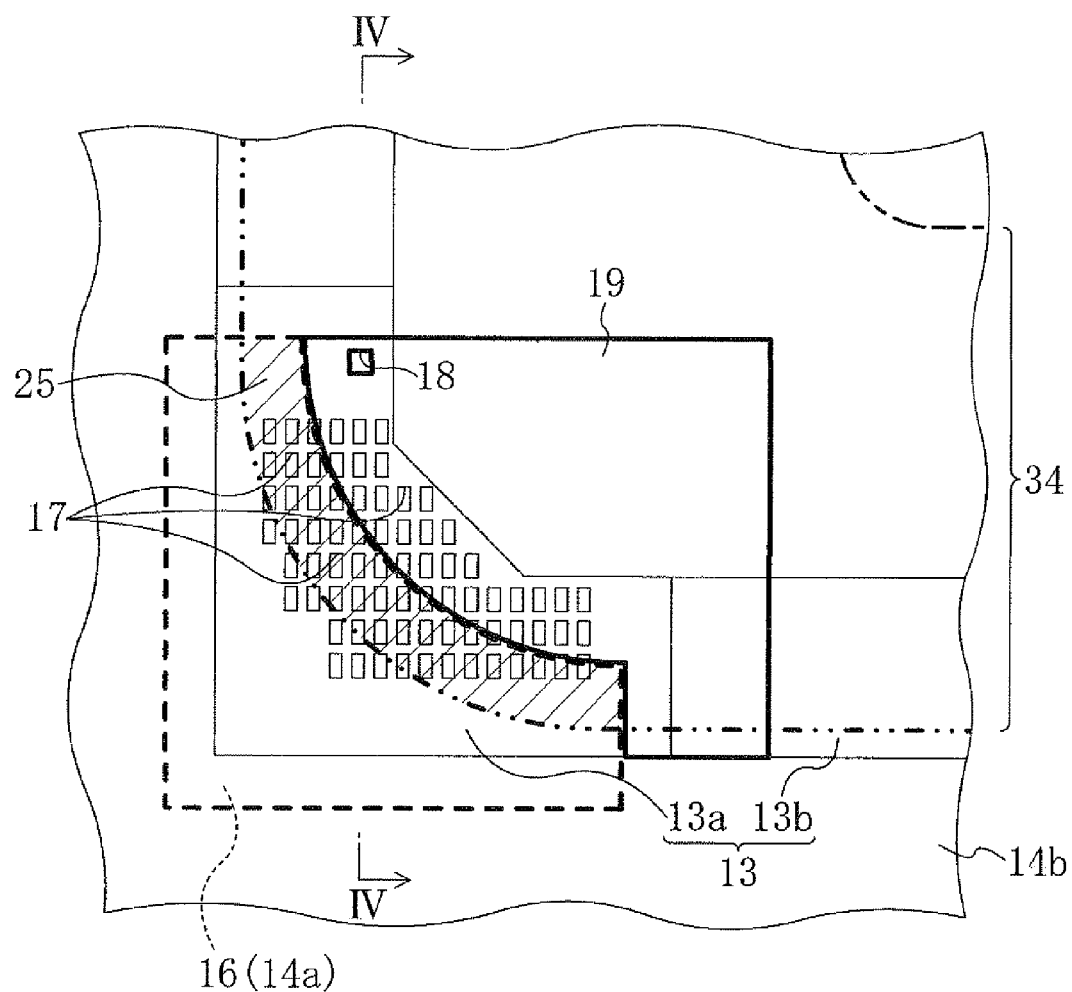
FIG. 3 is a plan view schematically showing a corner of a sealing material in the liquid crystal display device.
Figure 4:
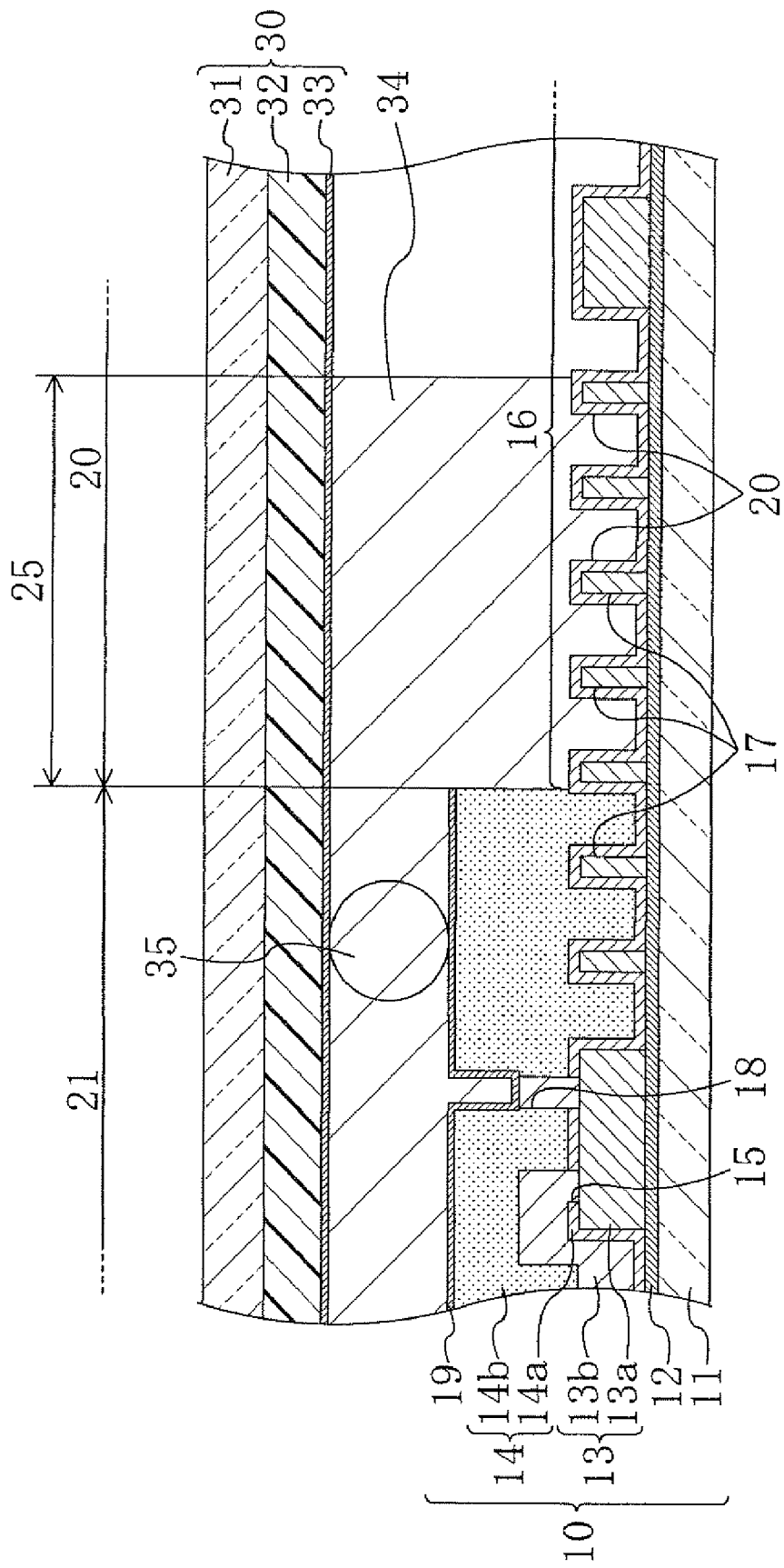
FIG. 4 is a view schematically showing the section taken along line IV-IV in FIG. 3.

FIGS. 1-8 show Embodiment 1 of the present invention. FIG. 1 is a plan view schematically showing a liquid crystal display device S. FIG. 2 is a schematic cross-sectional view of the liquid crystal display device S taken along line II-II in FIG. 1. FIG. 3 is an enlarged schematic plan view of region A at a corner of a sealing material 34 in the liquid crystal display device S. FIG. 4 is a schematic cross-sectional view of the region A taken along line IV-IV in FIG. 3. Note that polarizing plates 39 and 40 are omitted in FIG. 4.

As shown in FIGS. 1 and 2, the liquid crystal display device S as the display device includes: a rectangular thin film transistor (TFT) substrate 10 as the first substrate and a rectangular counter substrate 30 as the second substrate opposed to each other; and the rectangular frame-shaped sealing material 34 that bonds the TFT substrate 10 and the counter substrate 30 together. A liquid crystal layer 36 sealed inside the frame-shaped sealing material 34 is formed between the TFT substrate 10 and the counter substrate 30.

Alignment films 37 and 38 made of polyimide (PI) resin are respectively formed on the surfaces of the TFT substrate 10 and the counter substrate 30 facing the liquid crystal layer 36 inside the frame-shaped sealing material 34, and polarizing plates 39 and 40 are respectively formed on the surfaces thereof farther from the liquid crystal layer 36. The liquid crystal display device S has a display region made of a plurality of pixels arranged inside the frame-shaped sealing material 34 and a non-display region located outside the display region.

The counter substrate 30 has a glass substrate 31 made of $SiO_2$ and the like as shown in FIG. 4. On the glass substrate 31, formed in the display region are a plurality of color filters (not shown) and a black matrix 32 made of a resin material that defines the color filters. A common electrode layer 33 is formed to cover the color filters and the black matrix 32. The common electrode layer 33 is made of indium tin oxide (ITO).

The TFT substrate 10 has a glass substrate 11 made of $SiO_2$ and the like. Although not illustrated, a plurality of gate lines and a plurality of source lines are formed on the glass substrate 11 in the display region. The gate lines and the source lines extend to intersect each other, and a plurality of TFTs are formed at the intersections of these lines. The TFTs are of a top gate type, for example.

As shown in FIGS. 3 and 4, the TFT substrate 10 also includes: a common interconnect 13 for applying a voltage to the common electrode layer 32; a layered insulating film 14 including an inorganic insulating film 14a and an organic insulating film 14b stacked one upon the other to overlap the common interconnect 13; and a common electrode terminal 19 as the transparent conductive layer formed on the layered insulating film 14.

The common interconnect 13 is formed in a rectangular annular shape along the frame-shaped sealing material 34 to overlap the four corners of the sealing material 34 as shown in FIG. 3. The common interconnect 13 has a first common interconnect 13a and a second common interconnect 13b.

The first common interconnect 13a, made of a metal material such as Al, a MoW alloy, and Cr, is formed on a gate insulating film 12 for the TFTs formed on the glass substrate 11 to overlap each corner of the sealing material 34 as shown in FIGS. 3 and 4. The first common interconnects 13a are covered with the inorganic insulating film 14a as shown in FIG. 4.

The inorganic insulating film 14a, made of tetraethyl orthosilicate (TEOS), $SiN_x$, and the like, is formed to cover the gate lines to insulate the gate lines from the source lines at the intersections thereof although not illustrated. Also, the inorganic insulating film 14a has a plurality of contact holes 15 in each of which the first common interconnect 13a is exposed at the bottom.

The second common interconnect 13b, made of a metal material such as Al, a MoW alloy, and Cr, is formed to extend along the sealing material 34 between every two adjacent first common interconnects 13a as shown in FIG. 3. Each of the second common interconnects 13b is connected at one terminal thereof to the first common interconnect 13a located at one corner of the portion of the sealing material 34 along which the second common interconnect 13b extends via the corresponding contact hole 15 formed through the inorganic insulating film 14a. At the other terminal, the second common interconnect 13b is connected to the first common interconnect 13a located at the other corner of the portion of the sealing material 34 along which the second common interconnect 13b extends via the corresponding contact hole 15. In this way, each second common interconnect 13b is placed to electrically connect the first common interconnects 13a at the different corners of the sealing material 34 to each other. Such second common interconnects 13b, as well as the source lines, are covered with the organic insulating film 14b as shown in FIG. 4.

The organic insulating film 14b, made of an acrylic resin and the like, is formed on roughly the entire surface of the TFT substrate 10, but is partly removed in regions overlapping outer edge portions of the corners of the sealing material 34 as shown in FIGS. 3 and 4. Hence, the inorganic insulating film 14a has an exposed portion 16 exposed from the organic insulating film 14b in a region overlapping the outer edge portion of each corner of the sealing material 34.

In the exposed portion 16, a plurality of through holes 17 are formed through the first common interconnects 13a, and the inorganic insulating film 14a is formed to cover the through holes 17. The first common interconnect 13a has a plurality of through holes 17 also in the region covered with the organic insulating film 14b.

The common electrode terminal 19 is formed on the surface of the organic insulating film 14b to overlap each corner of the sealing material 34. A contact hole 18 is formed through the layered insulating film 14 to expose each of the first common interconnects 13a at the bottom, and each of the common electrode terminals 19 is connected to the common interconnect 13 (corresponding first common interconnect 13a) via the corresponding contact hole 18.

The common electrode terminal 19 is not formed in the region where the organic insulating film 14b has been removed, i.e., the exposed portion 16 of the inorganic insulating film 14a, but is formed in a region that is independent from the exposed portion 16. In other words, as shown in FIG. 4, a region 20 where the exposed portion 16 is formed and a region 21 where the common electrode terminal 19 is formed are different regions in the TFT substrate 10, and the entire exposed portion 16 is exposed from the common electrode terminal 19.

Although not illustrated, a plurality of contact holes are formed through the organic insulating film 14b to expose drain electrodes of the TFTs at the bottom, and a plurality of pixel electrodes respectively connected to the TFTs via the contact holes are arranged in a matrix. The pixel electrodes are covered with the alignment film 37.

The sealing material 34 is formed of an epoxy resin and the like and includes conductive particles 35. As the conductive particles 35, the following may be used: nickel- and gold-plated particles formed by coating the surfaces of spherical particles made of an elastic resin material, for example, with a conductive material such as nickel and gold, carbon particles, silver particles, and the like. The common electrode layer 33 is connected to the common electrode terminal 19 via the conductive particles 35 contained in the sealing material 34.

As described above, the liquid crystal display device S is configured as follows: while a predetermined signal is supplied to the common electrode layer 33 via the common interconnect 13, a predetermined signal is supplied to source lines and gate lines, thereby to write predetermined charge into pixel electrodes via drain electrodes of TFTs, whereby a predetermined voltage is applied across the liquid crystal layer 36 located between the pixel electrodes and the common electrode layer 33, to control the alignment of liquid crystal molecules and hence perform desire display.

Fabrication Method

Next, a method for fabricating the TFT substrate 10 and a method for fabricating the liquid crystal display device S will be described.

To fabricate the liquid crystal display device S, first, the TFT substrate 10 and the counter substrate 30 are fabricated separately, and then the two substrates 10 and 30 are bonded together with the sealing material 34. The sealing material 34 is then used to seal the liquid crystal layer 36 between the TFT substrate 10 and the counter substrate 30, and then exposed to light from the side facing the TFT substrate 10 and cured. Thereafter, the polarizing plates 39 and 40 are placed on the two substrates 10 and 30. Since the liquid crystal display device S of the present invention is particularly characterized in the structure of the TFT substrate 10, the fabrication method of the TFT substrate 10 will be described in detail with reference to FIGS. 5 to 8. FIGS. 5 to 8 are enlarged schematic cross-sectional views of a region of the glass substrate 11 where a corner of the sealing material 34 is to be formed, shown to illustrate fabrication process steps of the TFT substrate 10.

Figure 5:
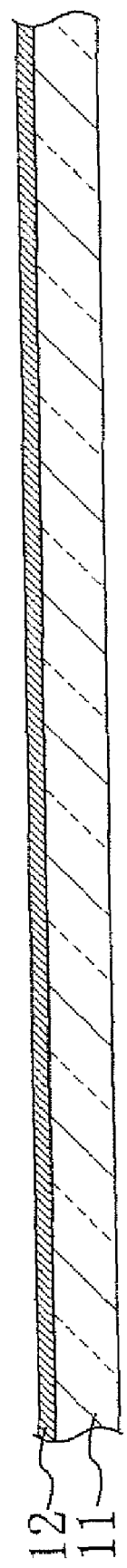
FIG. 5 is an enlarged schematic cross-sectional view of a region of a glass substrate with a gate insulating film formed thereon, in which the corner of the sealing material is to be formed.

When fabricating the TFT substrate 10, a semiconductor film made of amorphous silicon and the like is first formed on the pre-cleaned glass substrate 11 by chemical vapor deposition (CVD) although not illustrated. The semiconductor film is crystallized by laser annealing and the like, and then patterned by etching and the like, to form a plurality of semiconductor layers. The gate insulating film 12 is then formed by CVD and the like to cover the semiconductor layers. At this time, as shown in FIG. 5, the gate insulating film 12 is formed also in the region where a corner of the sealing material 34 is formed.

Figure 6:
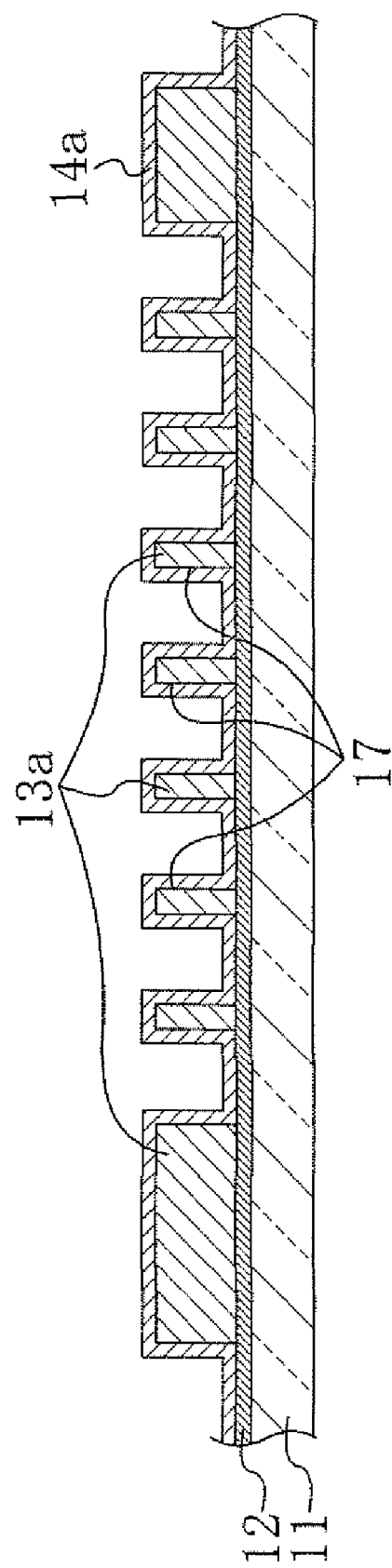
FIG. 6 is an enlarged schematic cross-sectional view of the region of the glass substrate with an inorganic insulating film formed thereon, in which the corner of the sealing material is to be formed.

Thereafter, a metal film made of Al, a MoW alloy, Cr, or the like is formed by sputtering and the like, and then patterned by etching and the like, to form the first common interconnects 13*a*, as well as the gate lines and the gate electrodes, as shown in FIG. 6. An impurity is then implanted in the semiconductor layers by ion implantation and the like using the gate lines as a mask. Thereafter, the inorganic insulating film 14*a* is formed by CVD and the like to cover the first common interconnects 13*a*, the gate lines and the gate electrodes.

Figure 7:
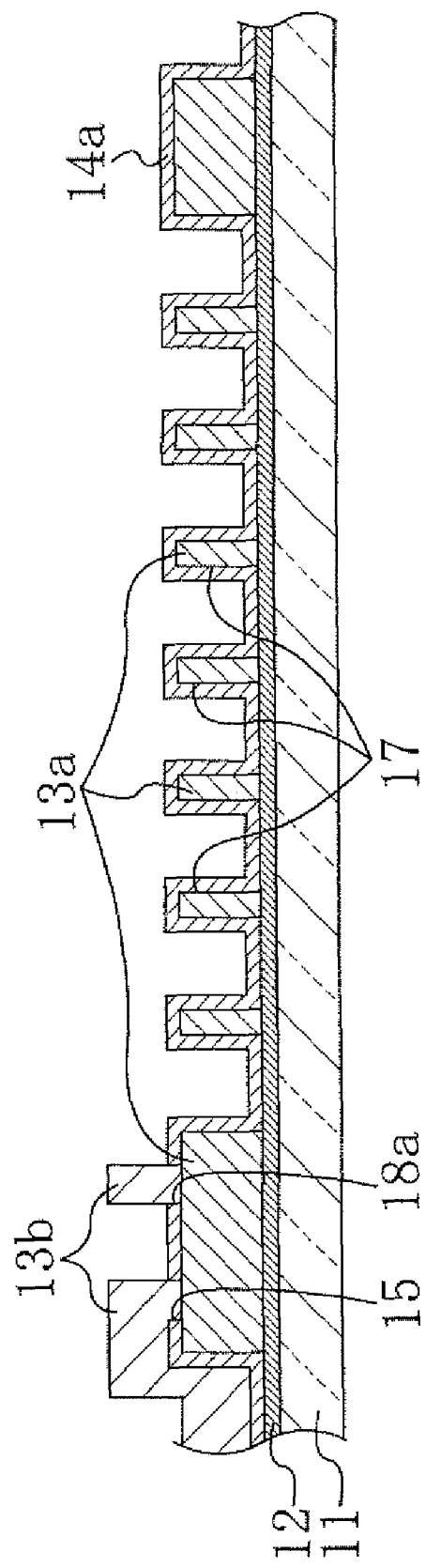
FIG. 7 is an enlarged schematic cross-sectional view of the region of the glass substrate with a second common interconnect formed thereon, in which the corner of the sealing material is to be formed.

As shown in FIG. 7, the contact holes 15 and 18*a* are formed through the inorganic insulating film 14*a* by etching and the like. Also, a pair of contact holes are formed through the gate insulating film 12 and the inorganic insulating film 14*a* on both sides of each gate electrode so that the corresponding semiconductor layer exposes at the bottom. Thereafter, a metal film made of Al, a MoW alloy, Cr, or the like is formed by sputtering and the like, and then patterned by etching and the like, to form the second common interconnects 13*b*, as well as the source lines, source electrodes, and drain electrodes.

Figure 8:
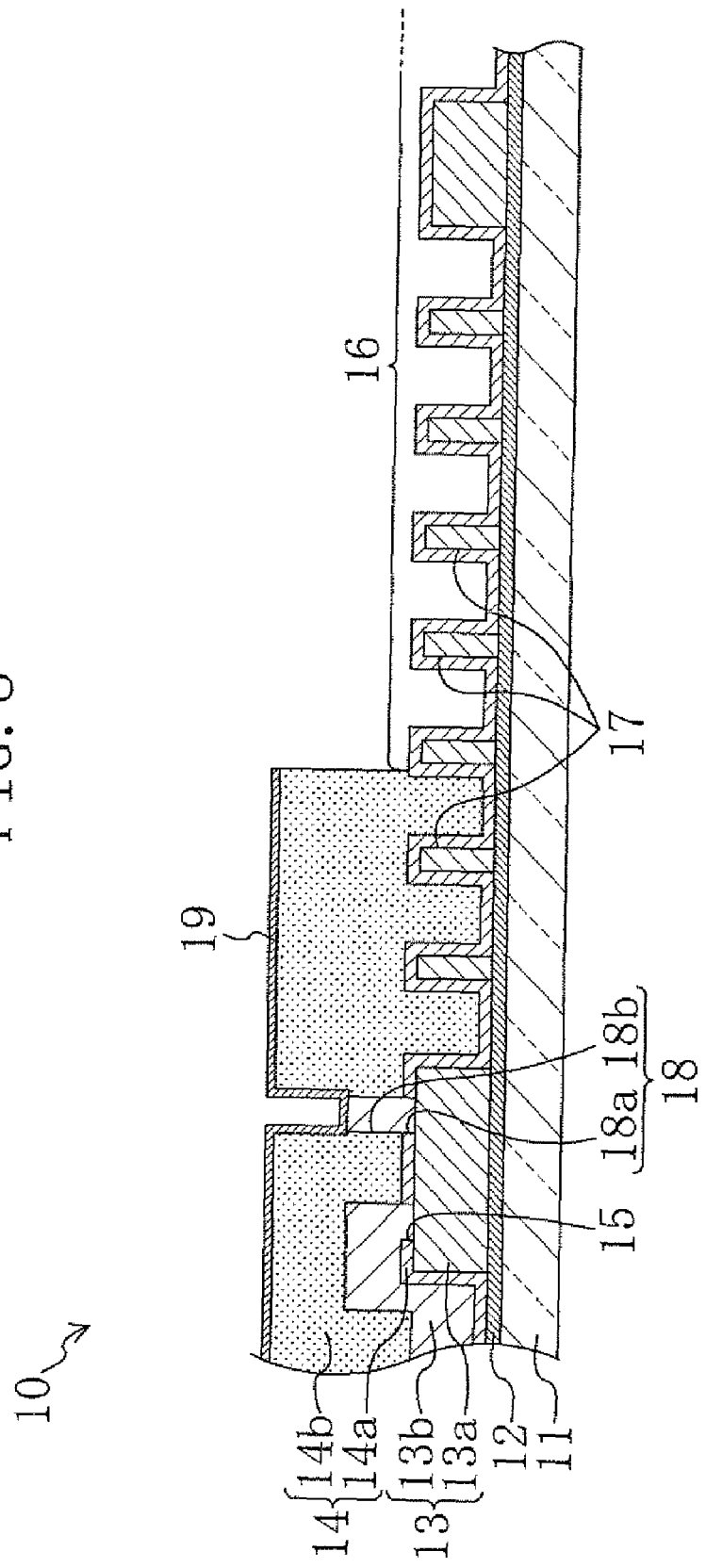
FIG. 8 is an enlarged schematic cross-sectional view of the region of the glass substrate with a common electrode terminal formed thereon, in which the corner of the sealing material is to be formed.
Figure 9:
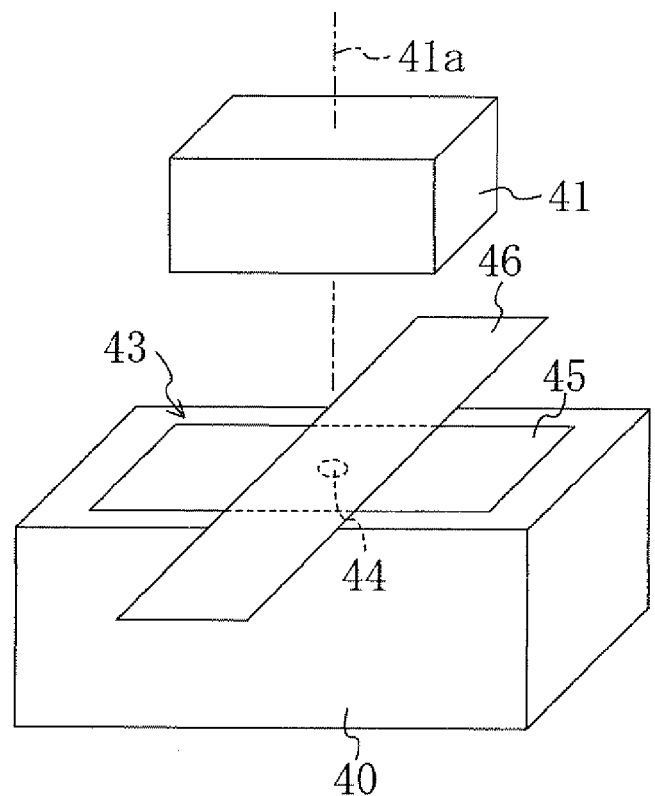
FIG. 9 is a perspective view schematically showing a cross peel strength test apparatus in which a test specimen is placed.
Figure 10:
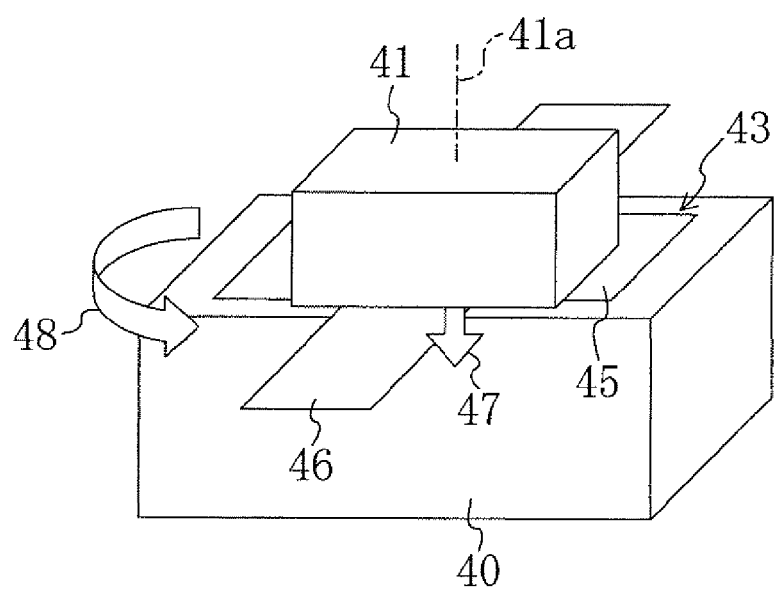
FIG. 10 is a perspective view schematically showing the operation of the cross peel strength test apparatus.
Figure 11:
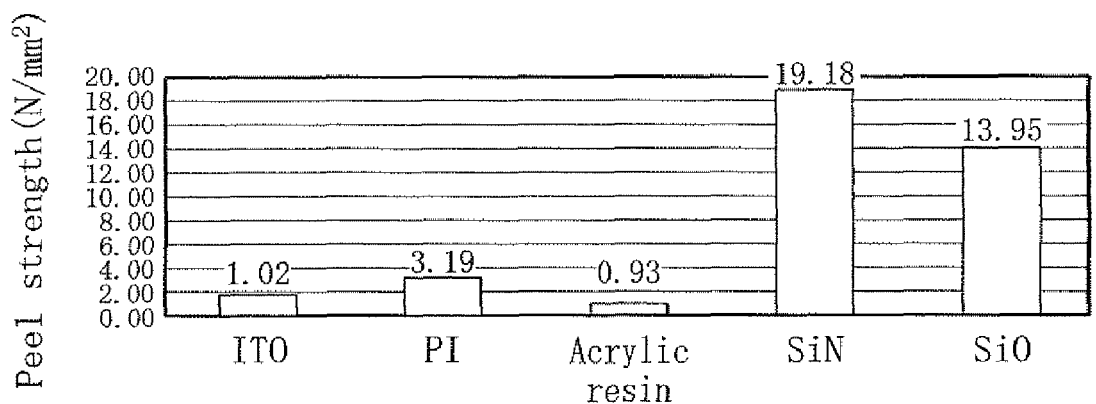
FIG. 11 is a view showing the peel strength (adherence) of a sealing material (epoxy resin) against a PI film, an ITO film, an acrylic resin film, a SiN film, and a glass substrate (SiO).

Subsequently, an organic insulating material is applied to cover the inorganic insulating film 14*a* and the source lines, to form an organic insulating film. As shown in FIG. 8, the organic insulating film is then partly removed by etching and the like in the regions in which the corners of the sealing material 34 are to be located, thereby to form the organic insulating film 14*b* and also provide the exposed portions 16 of the inorganic insulating film 14*a*. At this time, a plurality of contact holes 18*b* in which the first common interconnects 13*a* are exposed at the bottom, as well as a plurality of contact holes in which the drain electrodes are exposed at the bottom, are formed through the organic insulating film 14*b*. The contact holes 18 are thus formed through the layered insulating film 14.

An ITO film is then formed on the layered insulating film 14 by sputtering and then patterned by etching and the like, to form the common electrode terminals 19, as well as the pixel electrodes. At this time, the portions of the ITO film formed in the exposed portions 16 are removed, so that the entire of each exposed portion 16 is exposed from the common electrode terminal 19. In this way, the TFT substrate 10 in which the entire exposed portion 16 is exposed from the common electrode terminal 19 is fabricated.

Advantages of Embodiment 1

Figure 12:
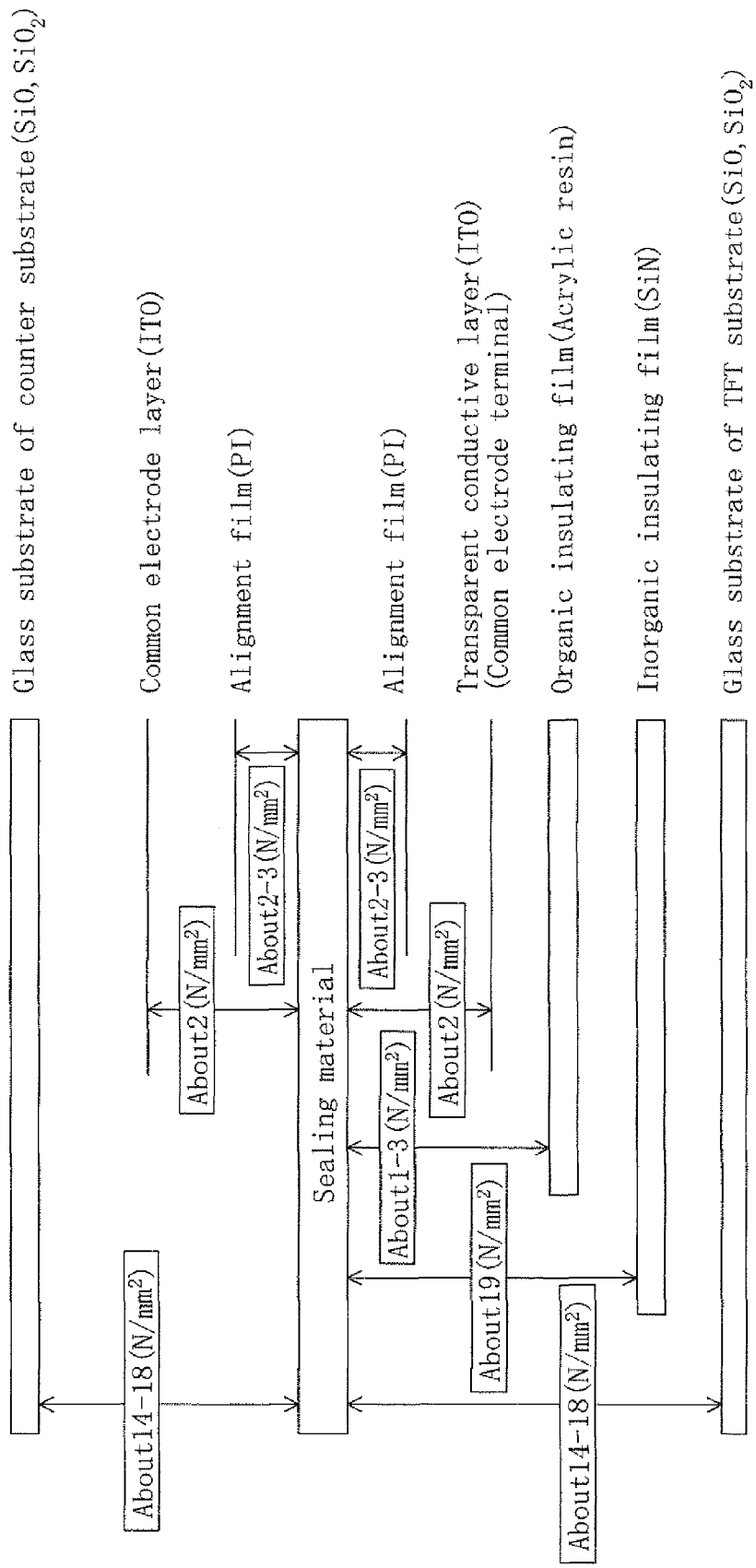
FIG. 12 is a view showing the relationship among the degrees of adherence of the sealing material to an alignment film, a transparent conductive layer, an organic insulating film, an inorganic insulating film, and a glass substrate constituting a liquid crystal display device (display device).
Figure 13:
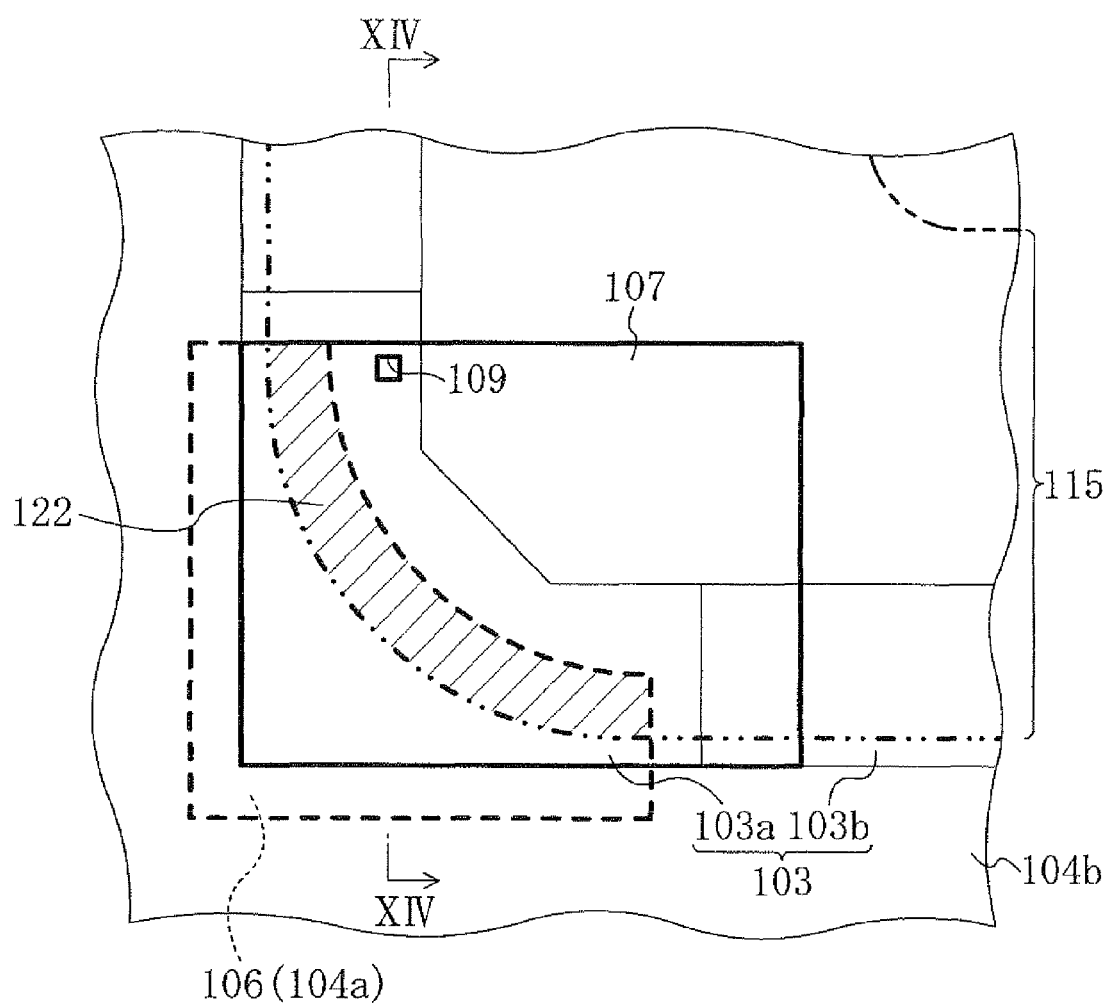
FIG. 13 is an enlarged plan view schematically showing a corner of a sealing material in a conventional liquid crystal display device.

FIG. 12 is a view showing the relationship among the degrees of adherence of the sealing material 34 to the alignment films 37 and 38, the common electrode terminal 19, the common electrode layer 33, the organic insulating film 14*b*, the inorganic insulating film 14*a*, and the glass substrates 11 and 31 constituting the liquid crystal display device S. As shown in FIG. 12, the adherence of the sealing material 34 to the inorganic insulating film 14*a* is markedly higher than that to any of the organic insulating film 14*b* and the common electrode terminal 19. In Embodiment 1, because the entire exposed portion 16 of the inorganic insulating film 14*b* exposed from the organic insulating film 14*a* is exposed from the common electrode terminal 19, the sealing material 34 can be directly bonded to the inorganic insulating film 14*a* in the entire region 25 (hatched region in FIG. 3) of the exposed portion 16 that overlaps the sealing material 34.

In addition to the above, in the exposed portion 16, a plurality of through holes 17 are formed through the first common interconnect 13*a*, and the inorganic insulating film 14*a* is formed covering the through holes 17. Hence, as shown in FIG. 4, since the inorganic insulating film 14*a* has depressions at the portions covering the through holes 17, the surface area of the portion of the inorganic insulating film 14*a* to which the sealing material 34 is bonded can be increased. Also, when the sealing material 34 is exposed to light from the side facing the TFT substrate 10, the light can be less blocked by the first common interconnect 13*a*, enhancing the light transmittance to the sealing material 34 under the light exposure, and hence permitting the sealing material 34 to be set more reliably. As a result, the adherence between the TFT substrate 10 and the sealing material 34 can be enhanced.

Moreover, since the exposed portion 16 is provided in each of the four corners of the sealing material 34, the surface area of the portions of the inorganic insulating film 14*a* to which the sealing material 34 is bonded can be increased, and also the light transmittance to the sealing material 34 under the light exposure from the side facing the TFT substrate 10 can be enhanced, compared with the case where the exposed portion 16 is not provided at all the four corners of the sealing material 34. Hence, the adherence between TFT substrate 10 and the sealing material 34 can further be enhanced.

Other Embodiments

In Embodiment 1 described above, the exposed portion 16 of the inorganic insulating film 14*a* was provided in each of the four corners of the sealing material 34. The present invention is not limited to this, but the exposed portion 16 may be provided in at least one of the four corners of the sealing material 34.

In Embodiment 1, the liquid crystal display device S was described. The present invention is not limited to this, but may be applied to other display devices such as an organic electroluminescence display device as far as such devices have a pair of substrates bonded together with a sealing material.

INDUSTRIAL APPLICABILITY

As described above, the present invention is useful in display devices, and in particular suitable to display devices required to enhance the adherence between a sealing material and a substrate having a transparent conductive layer for supplying a signal to an electrode layer of a counter substrate.

The invention claimed is:
1. A display device, comprising:
a first substrate and a second substrate opposed to each other; and a rectangular frame-shaped sealing material configured to bond the first substrate and the second substrate together, wherein the first substrate has an interconnect layer formed to overlap a corner of the sealing material, a layered insulating film including an inorganic insulating film and an organic insulating film stacked one upon the other to overlap the interconnect layer, and a transparent conductive layer formed on the layered insulating film to be connected to the interconnect layer via a contact hole formed through the layered insulating film, the second substrate has an electrode layer connected to the transparent conductive layer via a conductive particle contained in the sealing material, the inorganic insulating film has an exposed portion exposed from the organic insulating film at the corner of the sealing material, the exposed portion is entirely exposed from the transparent conductive layer, and in the exposed portion, a through hole is formed through the interconnect layer, and the inorganic insulating film is formed to cover the through hole.

2. The display device of claim 1, wherein the exposed portion is provided in each of the four corners of the sealing material.

3. The display device of claim 1, further comprising a liquid crystal layer sealed inside the frame-shaped sealing material between the first substrate and the second substrate.

* * * * *